US010768716B2

(12) United States Patent
Robinson et al.

(10) Patent No.: US 10,768,716 B2
(45) Date of Patent: Sep. 8, 2020

(54) VIRTUAL REALITY INPUT INCLUDING MAINTAINING A CURRENT MAPPING OF THE INPUT FROM AN INPUT DEVICE TO AN INPUT PLANE WITHIN THE 3D SPACE

(71) Applicant: HEWLETT-PACKARD DEVELOPMENT COMPANY, L.P., Houston, TX (US)

(72) Inventors: Ian N. Robinson, Palo Alto, CA (US); Hiroshi Horii, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/075,610

(22) PCT Filed: Oct. 21, 2016

(86) PCT No.: PCT/US2016/058022
§ 371 (c)(1),
(2) Date: Aug. 4, 2018

(87) PCT Pub. No.: WO2018/075054
PCT Pub. Date: Apr. 26, 2018

(65) Prior Publication Data
US 2019/0042002 A1    Feb. 7, 2019

(51) Int. Cl.
*G06F 3/0346*   (2013.01)
*G06F 3/01*     (2006.01)
(Continued)

(52) U.S. Cl.
CPC ............ *G06F 3/0346* (2013.01); *G06F 3/011* (2013.01); *G06F 3/03545* (2013.01);
(Continued)

(58) Field of Classification Search
None
See application file for complete search history.

(56) References Cited

U.S. PATENT DOCUMENTS 7,583,252 B2   9/2009   Kurtenbach et al.
7,696,998 B2   4/2010   Bae
(Continued)

FOREIGN PATENT DOCUMENTS

JP   2013084096 A   5/2013
JP      5876607 B1   3/2016
(Continued)

OTHER PUBLICATIONS

Lapides et al., "The 3D Tractus : A Three-dimensional Drawing Board", Retrieved from Internet: http://utouch.cpsc.ucalgary.ca/docs/Tractus-TableTop2006-PL.pdf, 2006, 8 pages.
(Continued)

*Primary Examiner* — David D Davis
(74) *Attorney, Agent, or Firm* — Fabian VanCott

(57) ABSTRACT

An input system may include a stylus, a positionable output device, a tablet to receive input via interaction with the stylus, and a three-dimensional (3D) workspace represented on a graphical user interface (GUI) of the positionable output device communicatively coupled to the tablet. Two-dimensional (2D) input on the tablet translates to a 3D input on the 3D workspace based on the orientation of an input plane represented in the 3D workspace. Interfacing the stylus with the tablet freezes a view of a tablet-to-input mapping displayed on the positionable output device.

5 Claims, 5 Drawing Sheets

(51) Int. Cl.
*G06F 3/041* (2006.01)
*G06F 3/0481* (2013.01)
*G06F 3/0484* (2013.01)
*G06F 3/0354* (2013.01)

(52) U.S. Cl.
CPC ............ *G06F 3/041* (2013.01); *G06F 3/0416* (2013.01); *G06F 3/04815* (2013.01); *G06F 3/04845* (2013.01)

(56) References Cited

U.S. PATENT DOCUMENTS

| | | | |
|---|---|---|---|
| 8,199,107 B2 | 6/2012 | Xu et al. | |
| 8,514,221 B2 | 8/2013 | King et al. | |
| 8,760,391 B2* | 6/2014 | Hawkins | G06F 3/017 345/156 |
| 8,791,899 B1* | 7/2014 | Usey | G06F 3/03545 345/156 |
| 8,922,558 B2 | 12/2014 | Page et al. | |
| 9,053,080 B2 | 6/2015 | Look et al. | |
| 2003/0227470 A1* | 12/2003 | Genc | G06F 3/011 345/633 |
| 2014/0320408 A1* | 10/2014 | Zagorsek | G06F 3/017 345/158 |
| 2015/0316980 A1 | 11/2015 | Miller | |
| 2015/0338934 A1* | 11/2015 | Hawkins | G06F 3/03545 345/157 |
| 2015/0363980 A1* | 12/2015 | Dorta | G06T 19/20 345/419 |
| 2016/0349959 A1* | 12/2016 | Pereira | G06F 3/04817 |
| 2019/0050132 A1* | 2/2019 | Rawlings | G06F 3/04812 |

FOREIGN PATENT DOCUMENTS

| | | |
|---|---|---|
| JP | 2016167219 A | 9/2016 |
| WO | 2014107629 A1 | 7/2014 |

OTHER PUBLICATIONS

Laviola Jr., "Bringing 2D Interfaces Into 3D Worlds", Advanced Topics in 3D User Interface Design, Retrieved from Internet: http://people.cs.vt.edu/~bowman/3dui.org/course_notes/siggraph2001/2dto3d.pdf, Mar. 1, 2001, 23 pages.

* cited by examiner

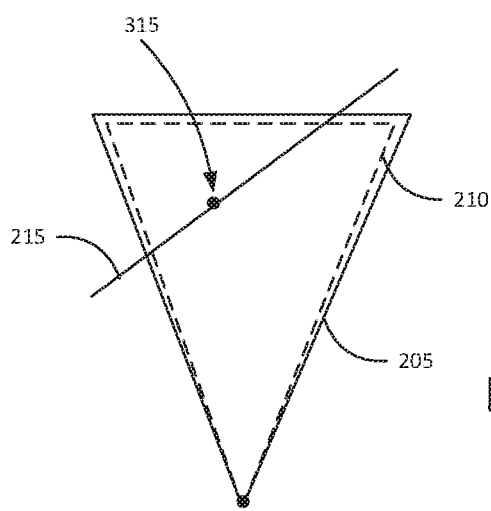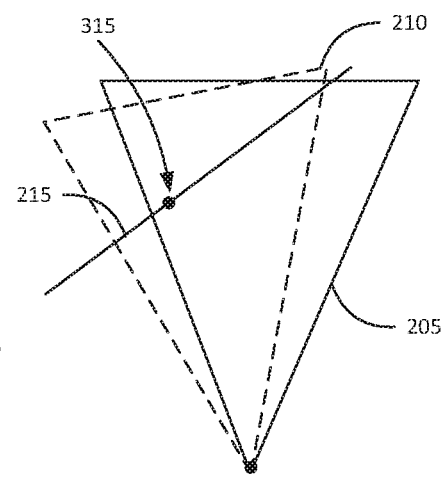
Fig. 4A                                    Fig. 4B

VIRTUAL REALITY INPUT INCLUDING MAINTAINING A CURRENT MAPPING OF THE INPUT FROM AN INPUT DEVICE TO AN INPUT PLANE WITHIN THE 3D SPACE

BACKGROUND

Computer-aided design (CAD) allows a user to create objects in three-dimensional (3D) space. These objects may be used to create physical 3D objects or better visualize those objects.

BRIEF DESCRIPTION OF THE DRAWINGS

The accompanying drawings illustrate various examples of the principles described herein and are a part of the specification. The illustrated examples are given merely for illustration, and do not limit the scope of the claims.

FIGS. 4A and 4B are top view diagrams of a view frustum and tablet frustum as before and after a viewpoint motion respectively according to an example of the principles described herein.

Throughout the drawings, identical reference numbers designate similar, but not necessarily identical, elements.

DETAILED DESCRIPTION

Figure 1:
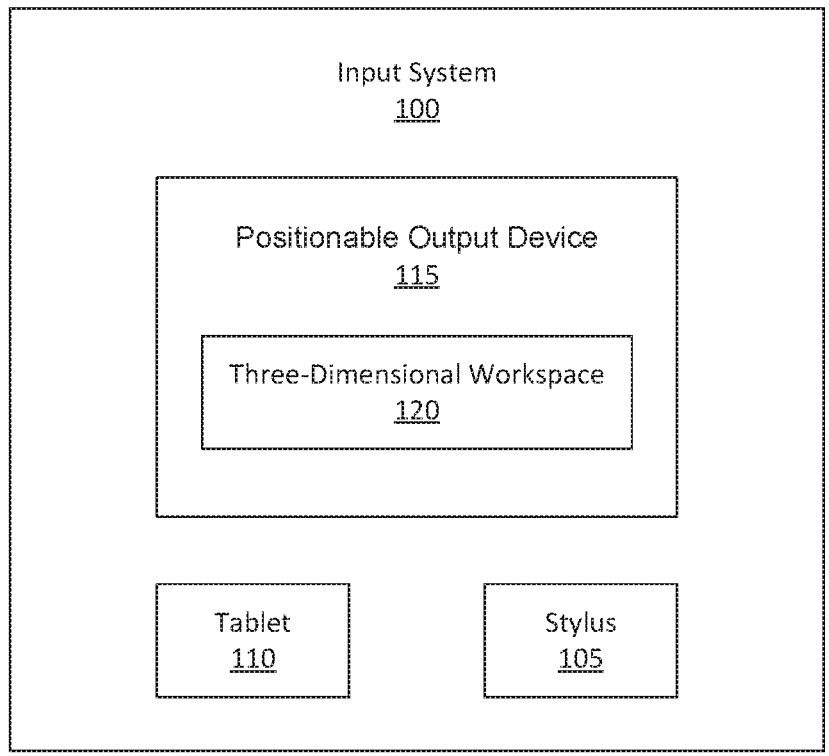
FIG. 1 is a diagram of an input system according to an example of the principles described herein.

As described above, CAD drawing is used to create 3D objects within a 3D space. In some instances, a user may execute a CAD program on a computing device that receives input from an input device and translates that input onto a two-dimensional (2D) screen. However, realizing a 3D object within a 3D workspace displayed on a 2D screen it not intuitive.

In some examples, a stylus is used as an input device. In this example, the stylus may be moved within a 3D space in order to allow the user to create the 3D object. However, this method of input, where the user's arm, hand and stylus are all unsupported, has proven to be imprecise compared to conventional, 2D-constrained input methods. Other types of input devices may be used but generally these types of input devices are not intuitive to a user and an amount of practice and/or mental visualization is implemented in order to create the intended 3D object.

The present specification, therefore describes an input system that may include a stylus, a positionable output device, a tablet to receive input via interaction with the stylus, and a three-dimensional (3D) workspace represented on a graphical user interface (GUI) of the positionable output device communicatively coupled to the tablet wherein two-dimensional (2D) input on the tablet translates to a 3D input on the 3D workspace based on the orientation of an input plane represented in the 3D workspace and wherein interface of the stylus with the tablet freezes a view of a tablet-to-input-plane mapping displayed on the positionable output device.

The present specification further describes a method of applying a two-dimensional (2D) input into a three-dimensional (3D) space including receiving input from a first input device at a processor indicating a change in position of an input plane within the 3D space represented on an output device, receiving input from a second input device having a 2D surface at the processor indicating a line to be drawn in the 3D space, representing the received input from the second input device as a 3D image on the 3D space displayed on the output device, and maintaining a current mapping of the input from the second input device to the input plane within 3D space when a stylus interacts with the second input device and as the output device is moved.

The present specification also describes a computer program product for applying a two-dimensional (2D) input into a three-dimensional (3D) space, the computer program product including a computer readable storage medium including computer usable program code embodied therewith, the computer usable program code to, when executed by a processor receive input from a first input device at a processor indicating a change in position of an input plane within the 3D space represented on an output device, receive input from a second input device having a 2D surface at the processor indicating a line to be drawn in the 3D space, represent the received input from the second input device as a 3D image on the 3D space displayed on the output device, and maintain a current mapping of the input from the second input device to the input plane within the 3D space when a stylus interacts with the second input device and as the output device is moved.

As used in the present specification and in the appended claims, the term "frustum" is meant to be understood as any three-dimensional region which is visible on a viewing. In some examples, the frustum is called a "view frustum." In an example, the frustum is the 3D shape of a clipped rectangular pyramid.

Additionally, as used in the present specification and in the appended claims, the term "a number of" or similar language is meant to be understood broadly as any positive number comprising 1 to infinity.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Turning now to the figures, FIG. 1 is a diagram of an input system (100) according to an example of the principles described herein. The input system (100) may include a stylus (105) and tablet (110) and a positionable output device (115) having a three-dimensional (3D) workspace (120) displayed therein. Each of these will now be described in more detail.

The stylus (105) may be any type of elongated device that a user may hold and touch to a surface such as the tablet (110). In an example, the stylus (105) is a passive or capacitive stylus in that the stylus (105) acts just like a human finger when touching a touch sensitive screen, for example. In this example, no electronic communication is present between the passive stylus and a device such as the tablet (110). In an example, the stylus (105) is an active stylus (105) in that the stylus (105) includes electronic components that communicate with the touchscreen controller on a device such as the tablet (110). During use, a user may implement the stylus (105) against or near the tablet (110) in order to have input received and presented on the 3D workspace (120) within the positionable output device (115).

The positionable output device (115) may be any device that implements a viewing surface to represent a 3D object or image within a 3D workspace (120). In an example and for convenience of description herein, the positionable output device (115) is a virtual reality (VR) headset implementing stereoscopic images called stereograms to represent the 3D object or image within the 3D workspace (120). The images shown by the 3D workspace (120) may be still images or video images based on what the user is to display within the VR headset (115). The VR headset (115) may present the 3D workspace (120) and 3D object or image to a user via a number of ocular screens. In an example, the ocular screens are placed in an eyeglass or goggle system allowing a user to view both ocular screens simultaneously. This creates the illusion of a 3D workspace (120) and 3D objects using two individual ocular screens.

The VR headset (115) may further include a gyroscopic device and an accelerometer. The gyroscope may be used to detect the orientation of the VR headset (115) in 3D space as the VR headset (115) is on the user's head. The accelerometer may be used to detect the speed and change in speed of the VR headset (115) as it travels from one location in 3D space to another location in 3D space. The gyroscope and accelerometer may provide to the processor this data such that movement of the VR headset (115) as it sits on the user's head is translated into a change in the point of view within the 3D workspace (120).

Although the present specification describes the user implementing a VR headset (115) in order to be presented with a 3D workspace (120), other types of environments may also be used. In an example, an augmented reality (AR) environment may be used where aspects of the real world are viewable in a visual representation while a 3D object is being drawn within the AR environment. Thus, much like the VR system described herein, an AR system may include a visual presentation provided to a user via a computer screen or a headset including a number of screens, among other types of devices to present a visual representation of the 3D workspace (120). Thus the present description contemplates the use of not only a VR environment but an AR environment as well.

During operation, a user may provide input to a processor using the stylus (105) and tablet (110). The input is then processed and presented to the user via the VR headset (115). Thus, the user may, in real time, create and see input created. This allows a user to manipulate the 3D workspace (120) and the 3D objects created therein to create or augment the 3D objects. In an example, the processor may be a built-in component of the tablet (110) and/or the VR headset (115). In an example, the processor may be a component of a computing device separate from the tablet (110) and/or VR headset (115). In this example, the computing device may receive the input from the tablet (110) and stylus (105) and cause the processor to relay the processed data to the VR headset (115) in real time.

The processor may be implemented in an electronic device. Examples of electronic devices include servers, desktop computers, laptop computers, personal digital assistants (PDAs), mobile devices, smartphones, gaming systems, VR headsets (115), and tablets, among other electronic devices.

The processor may be utilized in any data processing scenario including, stand-alone hardware, mobile applications, through a computing network, or combinations thereof. Further, the processor may be used in a computing network, a public cloud network, a private cloud network, a hybrid cloud network, other forms of networks, or combinations thereof. In one example, the methods provided by the processor are provided as a service over a network by, for example, a third party. In this example, the service may comprise, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, network, and components, among others; application program interface (API) as a service (APIaaS), other forms of network services, or combinations thereof. The present input system (100) may be implemented on one or multiple hardware platforms, in which certain modules in the system can be executed on one or across multiple platforms.

The input system (100) may further include various hardware components. Among these hardware components may the processor described above, a number of data storage devices, a number of peripheral device adapters, and a number of network adapters. These hardware components may be interconnected through the use of a number of busses and/or network connections. In one example, the processor, data storage device, peripheral device adapters, and a network adapter may be communicatively coupled via a bus.

The processor may include the hardware architecture to retrieve executable code from the data storage device and execute the executable code. The executable code may, when executed by the processor, cause the processor to implement at least the functionality of receiving input and displaying an image or series of images to a user via the VR headset (115) according to the methods of the present specification described herein. In the course of executing code, the processor may receive input from and provide output to a number of the remaining hardware units.

The data storage device may store data such as executable program code that is executed by the processor or another processing device. As will be discussed, the data storage device may specifically store computer code representing a number of applications that the processor executes to implement at least the functionality described herein.

The data storage device may include various types of memory modules, including volatile and nonvolatile memory. For example, the data storage device of the present example includes Random Access Memory (RAM), Read Only Memory (ROM), and Hard Disk Drive (HDD) memory. Many other types of memory may also be utilized, and the present specification contemplates the use of many varying type(s) of memory in the data storage device as may suit a particular application of the principles described herein. In certain examples, different types of memory in the data storage device may be used for different data storage needs. For example, in certain examples the processor may boot from Read Only Memory (ROM), maintain nonvolatile storage in the Hard Disk Drive (HDD) memory, and execute program code stored in Random Access Memory (RAM).

Generally, the data storage device may comprise a computer readable medium, a computer readable storage medium, or a non-transitory computer readable medium, among others. For example, the data storage device may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters enable the processor to interface with various other hardware elements. For example, the peripheral device adapters may provide an interface to input/output devices, such as, for example, display device, the VR headset (115), a mouse, or a keyboard. The peripheral device adapters may also provide access to other external devices such as an external storage device, a number of network devices such as, for example, servers, switches, and routers, client devices, other types of computing devices, and combinations thereof.

In an example, the VR headset (115) may be replaced with a display screen associated with a desktop or laptop computing device. In this example, operation of the input system (100) would be similar to the input system (100) implementing the stylus (105) and tablet (110) described above. In an example, the boundaries of the tablet frustum (210) and the boundaries of the user view frustum (205) would be equal. In an example, the boundaries of the tablet frustum (210) and the boundaries of the user visible frustum (205) are not equal with the boundaries of either the tablet frustum (210) or user visible frustum (205) being relatively larger than the other.

In an example, the VR headset (115) may be replaced with a touch screen display associated with a desktop or laptop computing device. In this example, operation would be similar to the above except that the boundaries of the tablet frustum (210) and the boundaries of the user visible frustum (205) are the same. In an example of the display being a stereo 3D display, the input system (100) may allow for the fact that the depth of the stylus (105) in the 3D workspace (120) is visible and fixed at the surface of the touch screen. Consequently, if a line is drawn on the surface of the touchscreen sloping into the 3D workspace, the view will follow, zooming in to the workspace to follow the stylus (105) as it draws.

Figure 2A:
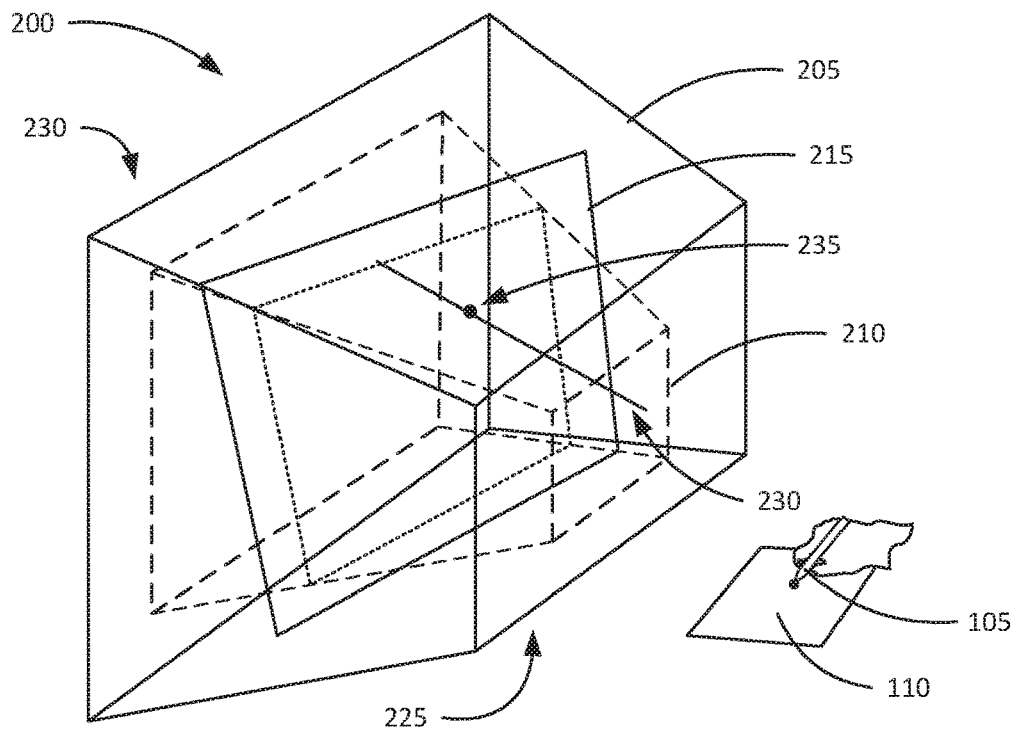
FIGS. 2A and 2B are user view reference diagrams implemented in a VR headset according to an example of the principles described herein.
Figure 2B:
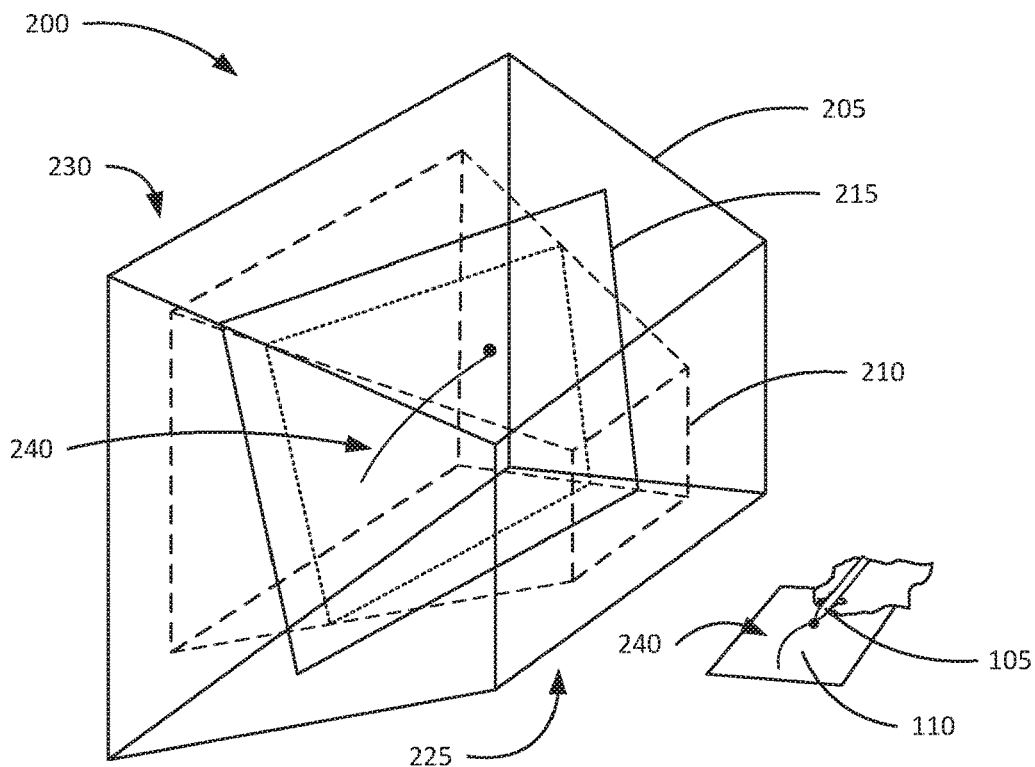

FIGS. 2A and 2B are user view reference diagrams (200) implemented in a VR headset (115) according to an example of the principles described herein. The view presented in the VR headset (115) contains a number of frustums (205, 210) and an input plane (215). The frustums (205, 210) include a user view frustum (205) and a tablet frustum (210). The user view frustum (205) is all of the 3D space or 3D workspace (120) visible to a user implementing the VR headset (115) described above, for a particular location and orientation of that VR headset (115). This volume of virtual space may include a number of widgets that the user can address by implementing an input device such as a mouse or the stylus (105) and tablet (110). By implementing the widgets, a user may adjust the position of the input plane (215) and/or the space within the user view frustum (205) that the tablet frustum (210) occupies. Additionally, the widgets may include other 3D object editing commands including any number of drawing tools such as palettes, fills, line drawing tools, object forming tools, cropping tools, and cutting tools, among others.

The tablet frustum (210) may be included within the user view frustum (205) at all times. The tablet frustum (210) corresponds to a mapped area on the 2D surface of the tablet (110). In an example, the user visible frustum (205) and the tablet frustum (210) share the same viewpoint (220). During operation of the VR headset (115), movement of the VR headset (115) while the user is viewing the 3D workspace (120) changes the view within the 3D workspace (120). As an example, if the user were to look left while wearing the VR headset (115), the ocular screens of the VR headset (115) would display to the user a view that is left of the view. In some examples, a view of a 3D object within the 3D workspace (120) may go "off screen" when a user looks to the left such that, in order to view the 3D object again, the user could position his or her head in its original position. The same would apply if the user were to look in any other direction: right, up down, etc. Thus, to the user, the 3D object in the 3D workspace (120) appears to remain in a specific location within the 3D workspace (120) and it is the user that is looking away. As such, a user may use the described input system (100) to draw any number of 3D objects within the 3D workspace (120).

Within the user view frustum (205) and tablet frustum (210), an input plane (215) may be visible. The input plane (215) may be freely translated and rotated within the 3D workspace (120) as described above using various user widgets. The boundaries of the input plane (215) may extend at least up to the sides of the tablet frustum (210). In an example, the input plane (215) does not extend beyond the near (225) or far (230) planes of the user view frustum (205) in the case of extreme rotations of the input plane (215) within the 3D workspace (120). In an example, the input plane (215) does extend beyond the near (225) or far (230) planes of the user view frustum (205) within the 3D workspace (120). In an example, the processor prevents the input plane (215) from being rotated or moved into a position where it appears edge-on in the image presented in the VR headset (115). In this example, a user viewing an edge-on view of the input plane (215) would see only a line representing the edge of the input plane (215). In such a situation, it may be difficult to draw on the input plane in such a configuration.

During operation, a user may engage the tablet (110) with the stylus (105) thus creating a point (235) on the input plane (215). The line (230) created from the pen input location and the input plane results in an intersection within the tablet frustum. FIG. 2B shows a user drawing a line (240). A digital representation of the line (240) is then produced on the input plane (215) within the user view frustum (205) of the 3D workspace (120). After a line has been drawn, the input plane (215) may be repositioned as desired to enable the user to draw a line in a different location in the 3D workspace. In another mode, moving the input plane (215) may also move all the lines associated with that input plane (215). Additionally, any line drawn by the user can be selected such that the input plane (215) onto which the line was drawn can be recalled thereby displaying that corresponding input plane (215) again. This would enable further lines to be added on that input plane (215), or allow all the lines associated with that plane to be moved together by moving the input plane. Although the description herein references the input from the tablet (110) and stylus (105) as a "line," various other types of input from these devices can result in various other types of markings being mapped onto the input plane (215). Examples of these other types of markings may include dots, 2D shapes, filled 2D shapes, 3D shapes, filled 3D shapes, clip art, and curves, among others. Consequently, the term "line" not meant to be limiting and instead is meant only as an example of a marking that could result from the input received from the tablet (110) and stylus (105).

In an example, the input plane (215) may be moved or rotated within the 3D workspace (120). As the user draws on the input plane (215), a 3D object is created based on the plane within the 3D workspace (120) that the input plane (215) occupies. As described above, in an example the user can position the input plane (215) using a number of widgets displayed next to the input plane (215). In an example, the user can position the input plane (215) by placing the stylus (105) in a dedicated manipulation mode. In this example, the stylus (105) may include a button or other activation device to switch from a "drawing" state to an "input plane (215) manipulation" states. In an example, the input plane (215) may be positioned using a six degree-of-freedom (DOF) input device. In this example, the six DOF input device may be controlled by the user using the user's non-drawing hand or the hand that is not holding the stylus (105).

In an example, the input plane (215) may be "snapped" to predetermined distance and angle increments. In this example, a user may input coordinates of the input plane (215) using the above mentioned widgets. In this example, certain inputs from the user to adjust the location of the input plane (215) may not be accepted until the user provides further instructions indicating that the input plane (215) may be "unsnapped" from the particular position. In an example, the input plane (215) may be "snapped" to a preexisting location in the 3D workspace (120). In this example, the preexisting location in the 3D workspace (120) may include an end of a previously drawn line. Further, a user may specifically position the input plane (215) within the 3D workspace (120) by snapping one axis of the input plane (215) between two existing line end points and then freely rotating the input plane (215) about that axis created in order to achieve a desired orientation, potentially snapping the plane to intersect a third point.

The input plane (215), itself, may also be manipulated. In an example, a widget displayed within the 3D workspace (120) may be actuated by the user to curve the input plane (215). In this example, the curvature of the input plane (215) along its axes could be manipulated using the widget. In this example, the curvature of the input plane may be manipulated in any way by the user allowing the user to both curve the input plane (215) as well as add edges and/or corners into the input plane (215). In an example, lines or other markings drawn on the input plane (215) may be used to create a new 3D input plane (215) having a user-defined shape. In an example, a curved line drawn on the input plane (215) could be extruded perpendicular to that input plane (215) to create an additional input plane (215) that the user may also implement. As a result, an additional widget may be used to toggle between the original input plane (215) and the additional input plane (215) while the user is drawing the 3D object in the 3D workspace (120). Any number of input planes (215) may be created. In order to prevent a view of the 3D object from being obstructed due to an abundance of created input planes (215), a previously created input plane (215) may be optically removed, faded out, or shadowed as an additional input plane (215) is created. Again, as a drawn line is selected, the input plane (215) associated with that line may be shown while the other input planes (215) are removed from view or faded out or shadowed.

Because the input system (100), in an example, implements a VR headset (115), changes in the position of the user's head changes the location of the tablet frustum (210). Consequently, while the user is drawing a curve, for example, the current view within the 3D workspace (120) is altered and the position of the input plane (215) in relation to the tablet frustum (210) may be changed. In an example, motion of the tablet frustum (210) relative to the 3D workspace (120) may be frozen by the user. In an example, the freezing of the tablet frustum (210) may be accomplished as the stylus (105) engages the surface of the tablet (110). In an example, the freezing of the tablet frustum (210) may be accomplished as the stylus (105) is within a threshold "hover" distance above the tablet (110). Motion or adjustment of the tablet frustum (210) may be re-enabled when the stylus (105) is lifted off of the surface of the tablet (110), when the threshold distance between the tablet (110) and stylus (105) is exceeded, or explicitly by a user activating a widget that re-enables movement of the tablet frustum (210).

In an example, the input system (100) implements an augmented reality (AR) headset. As described above, the user is provided with aspects of the real world along with a visual representation of a 3D object being drawn in the AR environment. During operation, the user may draw and adjust the 3D object being formed similarly as described above. In an example, a user implementing the AR headset, however, may interact with real surfaces in the AR environment. Specifically, a user implementing the above described tablet (110) and stylus (105) may draw a 3D object onto a real world surface that has been mapped by, for example, a laser mapping system associated with the input system (100). This mapping of the visible real world surfaces allows a user to virtually draw on the surface of real world surfaces such as walls, ceilings, and floors. Additionally, because all real world surfaces may be mapped this way, the input plane may be these real world surfaces. Consequently, as mentioned above, the input plane (215) may include not only flat surfaces but curved surfaces as well such as a globe, a pipe, a cone, a square, among any other curved or multiple-surface object. In this example, a user may virtually add objects onto surfaces of any real world object, add color to the surface of any real world object, and incorporate virtual 3D objects into or on real world surfaces and objects, among others actions.

Figure 3:
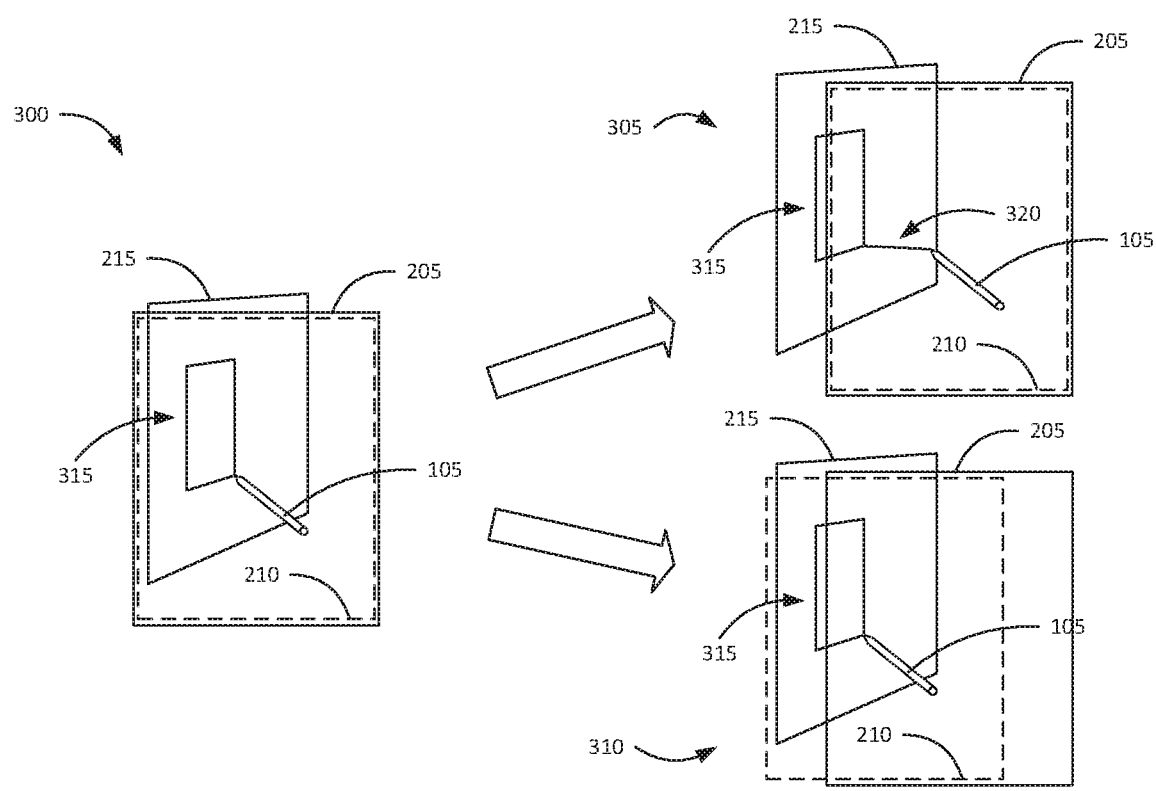
FIG. 3 is a diagram showing two resulting view reference diagrams resulting from an unfrozen and frozen view, respectively, according to an example of the principles described herein.

In an example, where the user implements an AR headset, any real world surface may be mapped as described above, and extrapolated into a virtual 3D object. This allows a user to "copy" the real world surface and place that copy within the AR environment. This allows the user to manipulate the 3D object as described above and define that newly copied surface as the input plane (215) itself. A number of widgets provided in the AR environment similar to that described in connection with the VR environment may be provided to the user to execute the "copy," "move," and input plane (215) designation actions as described herein. FIG. 3 is diagram showing two resulting view reference diagrams resulting from an unfrozen (305) and frozen view (310), respectively, according to an example of the principles described herein. An originating view reference (300) shows the user view frustum (205) and tablet frustum (210) as well as the input plane (215) described above. In the originating view (300) a user is currently engaged in drawing an object on the surface of the input plane (215) via the tablet (110) and stylus (105) as described above. The stylus (105) shown on the input plane (215) is by reference only and is not to be understood as the input plane (215) comprising a visual representation of the stylus (105).

As described above, motion of the tablet frustum (210) relative to the 3D workspace (120) and user visible frustum (205) may be frozen by the user. Without the freezing of the tablet frustum (210), the unfrozen view (305) is the result. In the unfrozen view (305), a user currently drawing may mistakenly draw in a location on the input plane (215) that was not expected. In the example shown in FIG. 3, the unfrozen view (305) shows a situation where a currently drawn object (315) includes unintentional mark (320). The unintentional mark (320) is the result of the motion of the tablet frustum (210) relative to the 3D workspace (120) being changed due to a user of the VR headset (115) turning his or her head; in this example, to the right. Because the user is not able to maintain the tablet frustum (210) in the same location, the unintentional mark (320) is drawn. However, the user may activate a frozen state such that a frozen view (310) is maintained. In an example, for small movements of the users head and the VR headset (115), the tablet frustum (210) remains fixed relative to the input plane (215) while the view frustum (205) moves with the user's head. In an example, movements of the user's head and the VR headset (115) causes the tablet frustum (210) to pivot around the user's viewpoint independent of the user view frustum (205) so that the current x and y coordinate location of the marking produced by the stylus (105) does not change. This is seen in FIGS. 4A and 4B. As described above, a user may, according to one example, engage the frozen view (310) by applying the stylus (105) to the surface of the tablet (110). In an example, a user may engage the frozen view (310) by passing an end of the stylus (105) past a threshold distance from the surface of the tablet (110). In still another example, a user may engage the frozen view (310) by pushing a button on the stylus (105). In a further example, a user may engage the frozen view (310) by actuating a widget placed within the 3D workspace (120).

FIGS. 4A and 4B are top view diagrams of a view frustum (205) and tablet frustum (210) as before and after a viewpoint motion respectively according to an example of the principles described herein. As briefly described above, when the user has finished moving the input plane (215) to a specific location, the input plane (215) stays fixed in the 3D workspace (120) as the user moves their viewpoint. Additionally, the mapping of the current (x, y) position of the stylus (105) on the tablet (110) to the input plane (215) is locked as described above. Consequently, if the stylus (105) is placed onto, for example, the top right corner of the tablet (110), a currently drawn object (315) will appear where the top right edge of the tablet frustum (210) intersects the input plane (215). If the stylus (105) is maintained still on the tablet (110) and the user shifts and/or turns his or her head with the VR headset (115) so the currently drawn object (315) is in the center of the user's view frustum (205), the location on the input plane (215) of the stylus (105) doesn't change. Additionally, the currently drawn object (315) should stay a currently drawn object (315) without additional markings on the input plane (215) being made. FIG. 4B shows the tablet frustum (210) and view frustum (205) both pointing back towards the same viewpoint, but now extend off in different directions so that the intersection of the pen location within the tablet frustum (210) with the input plane (215), the point marked by the currently drawn object (315), stays fixed. For simplicity, the above examples assume the stylus (105) is not moved as the user changes their viewpoint, but this is not a requirement. On each display update cycle the tablet frustum (210) is recalculated as described above, and then any changes in the stylus (105) position on the tablet (110) are translated into a stroke input on the input plane (215) based on this new mapping.

In an example, a line or other indicator may be placed within the 3D workspace (120) indicating the boundaries of the tablet frustum (210). In one example. the indicator indicating the boundaries of the tablet frustum (210) may be visible to the user at all times. In another example, the indicator indicating the boundaries of the tablet frustum (210) may become visible when the user's stylus (105) approaches the boundary of the tablet frustum (210).

As a result of the freezing feature described above, a user may draw a 3D object within the 3D workspace (120) without inadvertently making an unintended mark. During the drawing process, a user may not be able to keep his or her head completely still. Instead, there may be inadvertent small shifts in the user's head position with the impact of these shifts being magnified significantly depending on the distance between viewpoint and the input point in the 3D workspace (120). In order to support precise input, the mapping may be frozen as describe above for at least the duration of the stylus (105) stroke.

Figure 5:
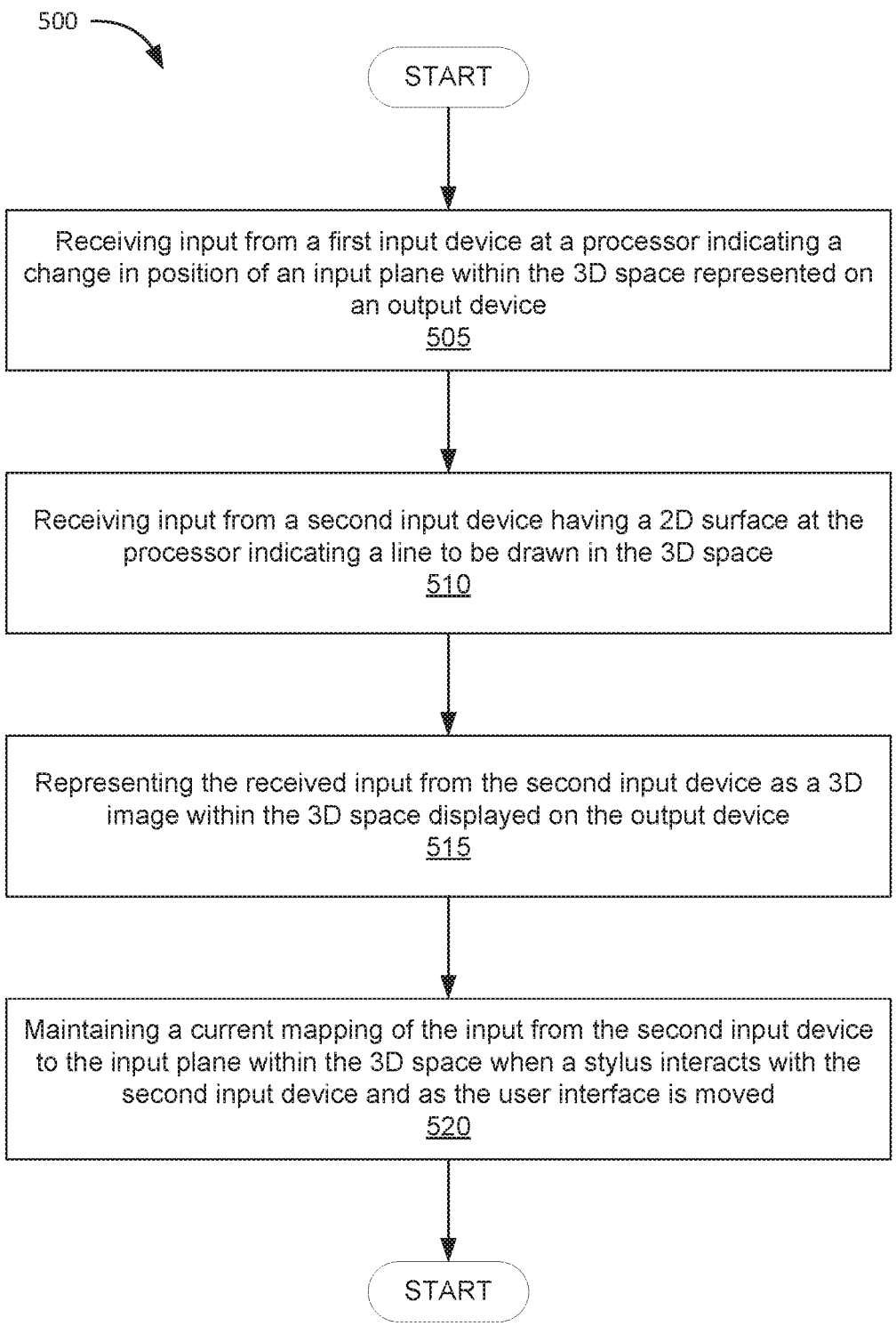
FIG. 5 is a flowchart showing a method of applying a two-dimensional (2D) input into a three-dimensional (3D) space according to one example of the principles described herein.

FIG. 5 is a flowchart showing a method (500) of applying a two-dimensional (2D) input into a three-dimensional (3D) space according to one example of the principles described herein. The method (500) may begin with receiving (505) input from a first input device at a processor indicating a change in position of an input plane (215) within the 3D space represented on an output device. In an example, the first input device is a stylus (105) and tablet (110). In this example, the stylus (105) may be used to adjust the input plane (215) as described above. In an example, the first input device is a mouse. In this example, a user may implement a stylus (105) and tablet (110) along with the mouse to both draw a 3D image in the 3D workspace (120) and adjust the input plane (215).

The method (500) may continue with receiving (510) input from a second input device having a 2D surface at the processor indicating a line to be drawn in the 3D space. In an example, the second input device is a stylus (105) and tablet (110). As described above, the stylus (105) and tablet (110) receive (510) input and pass the input onto a processor associated with the input system (100).

The method (500) may continue with representing (515) the received input from the second input device as a 3D image within the 3D space displayed on a user interface. The processor converts the input data presented by the stylus (105) and tablet (110) into image data and presents the image data to a user via, for example, the VR headset (115) or AR headset described above. During the representation (515) of the received input from the second input device, the processor maintains (520) a current mapping of the input from the second input device to the input plane within the VR headset when a stylus interacts with the second input device and as the VR headset is moved. As described above, maintaining (520) the current mapping of the input from, for example, the tablet to the input plane allows a user of the VR headset (115) to adjust the position of his or her head while drawing a 3D object in the 3D workspace (120). This prevents unintended and errant drawing strokes by the user.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe an input system implementing a virtual reality headset to provide a user with a relatively intuitive way of creating 3D images within a 3D workspace. The input device and the method described herein allow for a user to adjust an input plane such that a 2D input on a tablet is translated into a 3D image within the 3D workspace. Additionally, a user may use the VR headset while still drawing on the tablet as a result of a freeze feature. The freeze feature freezes the mapping of the tablet to the input plane when a stylus contacts or breaches a threshold distance from a tablet. The result provides for a user to input strokes on the input plane without changes in the user's head position causing unintentional markings when the user turns his or her head.

The preceding description has been presented to illustrate and describe examples of the principles described. This description is not intended to be exhaustive or to limit these principles to any precise form disclosed. Many modifications and variations are possible in light of the above teaching.

What is claimed is:

1. An input system, comprising:
   a stylus;
   a positionable output device;
   a tablet to receive input via interaction with the stylus; and
   a three-dimensional (3D) workspace represented on a graphical user interface (GUI) of the positionable output device communicatively coupled to the tablet;
   wherein two-dimensional (2D) input on the tablet translates to a 3D input on the 3D workspace based on the orientation of an input plane represented in the 3D workspace; and
   wherein interface of the stylus with the tablet freezes a view of a tablet-to-input mapping displayed on the positionable output device;
   wherein the input plane is adjustable with reference to a consistent point of reference within the 3D workspace;
   wherein the input plane fits within a tablet frustum defined within a view frustum within the 3D workspace.

2. The input system of claim 1, wherein boundaries of the input plane extend between the tablet frustum and the view frustum.

3. A computer program product for applying a two-dimensional (2D) input into a three-dimensional (3D) space, the computer program product comprising:
   a non-transitory computer readable storage medium comprising computer usable program code embodied therewith, the computer usable program code to, when executed by a processor:
   receive input from a first input device at a processor indicating a change in position of an input plane within the 3D space represented on an output device;
   receive input from a second input device having a 2D surface at the processor indicating a line to be drawn in the 3D space;
   represent the received input from the second input device as a 3D image within the 3D space displayed on the output device; and
   maintain a current mapping of the input from the second input device to the input plane within the 3D space when a stylus interacts with the second input device and as the output device is moved;
   wherein the input plane fits within a tablet frustum of the second input device that is defined within a view frustum within the 3D workspace.

4. The computer program product of claim 3, further comprising computer usable program code to, when executed by a processor, receive instructions to map.

5. The computer program product of claim 3, further comprising computer usable program code to, when executed by a processor, prevent the input plane from aligning edge-on to a user viewpoint.

* * * * *